(12) United States Patent
Jenkins (10) Patent No.: US 6,950,502 B1
(45) Date of Patent: Sep. 27, 2005

(54) ENHANCED SCHEDULED MESSAGING SYSTEM

(75) Inventor: Kelly Jenkins, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 342 days.

(21) Appl. No.: 10/227,375

(22) Filed: Aug. 23, 2002

(51) Int. Cl.[7] .............................................. H04M 1/64
(52) U.S. Cl. ............................... 379/88.12; 379/88.16; 379/88.25
(58) Field of Search .......................... 379/88.11–88.18, 379/88.22–88.27

(56) References Cited

U.S. PATENT DOCUMENTS

| | | | | |
|---|---|---|---|---|
| 5,247,568 A | * | 9/1993 | Bergsman et al. | 379/88.23 |
| 5,251,251 A | * | 10/1993 | Barber et al. | 379/88.23 |
| 5,646,982 A | * | 7/1997 | Hogan et al. | 379/88.22 |
| 5,652,789 A | * | 7/1997 | Miner et al. | 379/201.01 |
| 5,787,151 A | * | 7/1998 | Nakatsu et al. | 379/88.23 |
| 5,870,454 A | * | 2/1999 | Dahlen | 379/88.14 |
| 5,920,576 A | * | 7/1999 | Eaton et al. | 714/749 |
| 5,991,370 A | * | 11/1999 | Ladd | 379/88.25 |
| 6,052,440 A | * | 4/2000 | Yuhn | 379/88.13 |
| 6,085,101 A | * | 7/2000 | Jain et al. | 455/500 |
| 6,097,791 A | * | 8/2000 | Ladd et al. | 379/88.19 |
| 6,137,864 A | * | 10/2000 | Yaker | 379/88.22 |
| 6,259,772 B1 | * | 7/2001 | Stephens et al. | 379/88.23 |
| 6,263,202 B1 | * | 7/2001 | Kato et al. | 455/418 |
| 6,269,151 B1 | * | 7/2001 | Hanson | 379/69 |
| 6,272,532 B1 | * | 8/2001 | Feinleib | 709/206 |
| 6,442,250 B1 | * | 8/2002 | Troen-Krasnow et al. | 379/93.15 |
| 6,549,769 B1 | * | 4/2003 | Harder | 455/418 |
| 6,731,725 B1 | * | 5/2004 | Merwin et al. | 379/88.23 |
| 6,760,412 B1 | * | 7/2004 | Loucks | 379/88.13 |
| 6,765,997 B1 | * | 7/2004 | Zirngibl et al. | 379/88.18 |
| 6,788,946 B2 | * | 9/2004 | Winchell et al. | 455/459 |
| 6,854,007 B1 | * | 2/2005 | Hammond | 709/206 |
| 2001/0029175 A1 | * | 10/2001 | Sellen et al. | 455/412 |
| 2002/0120507 A1 | * | 8/2002 | Chanos et al. | 705/14 |
| 2002/0172331 A1 | * | 11/2002 | Barker | 379/67.1 |
| 2002/0191757 A1 | * | 12/2002 | Belrose | 379/88.13 |
| 2002/0193996 A1 | * | 12/2002 | Squibbs et al. | 704/260 |
| 2004/0044583 A1 | * | 3/2004 | Thibault | 705/26 |
| 2004/0140989 A1 | * | 7/2004 | Papageorge | 345/700 |
| 2004/0249890 A1 | * | 12/2004 | Fellenstein et al. | 709/206 |

FOREIGN PATENT DOCUMENTS

JP 63211841 A * 9/1998 ........... H04L 11/20

* cited by examiner

Primary Examiner—Roland G. Foster
(74) Attorney, Agent, or Firm—Withers & Keys, LLC (57) ABSTRACT

Systems and techniques for communicating by receiving data and instructions from a sender, the instructions including at least a delivery time of a scheduled voicemail message intended for a recipient and contact information associated with the recipient; generating a scheduled voicemail message according to the data and instructions received from the sender; storing the scheduled voicemail message; and processing the scheduled voicemail message according to the data and instructions received from the sender.

27 Claims, 11 Drawing Sheets

ENHANCED SCHEDULED MESSAGING SYSTEM

TECHNICAL FIELD

The present invention relates generally to a communications system and, more particularly, to a communications system having enhanced scheduled messaging features.

BACKGROUND

Telecommunications services are an integral part of business and personal life, allowing geographically remote users to communicate irrespective of location and to form and maintain relationships. Communications between users may assume a variety of formats, such as, for example telephone calls, e-mail messages, instant messages, pages, and voicemail messages.

There are situations when the timing of a communication is crucial. For example, friends and family typically look forward to and often expect messages that recognize special occasions, such as holidays, birthdays, anniversaries, graduations, etc. A message sent to recognize such an occasion, however, may not have the desired effect if the message is not delivered at the appropriate time. In particular, a message sent well after an event has passed often must assume the form of an apology.

Additionally, being aware of an occasion ahead of time may be of little consequence if such awareness does not coincide with an appropriate time for acknowledging the occasion. In many cases, a person may be aware of or remember an upcoming event too far in advance to send an appropriately timed message. For instance, a birthday message delivered to a person more than a week before the person's actual birthday may call into question the sender's knowledge of the actual birthday.

In general, telecommunications services strive to deliver messages as quickly as possible from a sender to a recipient. As described above, however, there are times when sending a message to a recipient should be delayed. On the other hand, by delaying, the sender runs the risk of forgetting to send the message entirely.

Accordingly, users would benefit from a communications system that enables messages to be appropriately scheduled. While certain existing communications systems used in business, allow a delivery date to be assigned to a voicemail reply, enhanced messaging scheduling features are needed to address the evolving needs of consumer customers.

SUMMARY

In one general aspect, a communications method includes receiving data and instructions from a sender, the instructions including at least a delivery time of a scheduled voicemail message intended for a recipient and contact information associated with the recipient; generating a scheduled voicemail message according to the data and instructions received from the sender; storing the scheduled voicemail message; and processing the scheduled voicemail message according to the data and instructions received from the sender.

Implementations may include one or more of the following features. For example, the data may include voice data and/or audio data. The instructions may indicate standard content and/or marketing content to be included with the scheduled voicemail message. The standard content may be a greeting including a prerecorded voice message and/or sounds specified by the sender. The prerecorded voice message may include a voice of a celebrity and/or a character (e.g., actor, Santa Clause). The sounds may include music, songs, and/or sound effects. The marketing content may be a message associated with a service provider and/or a merchandiser. The marketing content may include a gift message and/or an advertising message. The gift message may include a gift certificate or gift check to be claimed by the recipient and paid for by the sender.

The data and instructions may be received from a mobile phone, a landline telephone, and/or a Web-enabled device. The generated scheduled voicemail message may include data, content (e.g., standard content, marketing content, a gift option), and/or identifiers (e.g., a message identifiers, a standard content identifiers, a marketing content identifiers).

In some implementations, the scheduled voicemail message is stored until the scheduled delivery time. The scheduled voicemail message may be stored in a designated area of a sender's voice mailbox and/or a recipient's voice mailbox. Processing the scheduled voicemail message may involve storing the scheduled voicemail message and/or attributes of the scheduled voicemail message in a designated area of a recipient's voice mailbox.

Implementations may include sending a reminder to the sender as the scheduled delivery time for a particular scheduled voicemail message approaches. The reminder may enable the sender to review, edit, update, and/or delete a scheduled voicemail message. Implementations also may include sending a notification of the scheduled voicemail message to the recipient. The notification may not identify the voicemail message as being scheduled.

The scheduled voicemail message may be delivered to the recipient, and the sender may be sent a notification that the scheduled voicemail message was delivered and/or heard. The notification may enable the sender to review, edit, update and reschedule the voicemail message and/or create a new scheduled voicemail message. The sender also may schedule a reminder message, for instance, an e-mail message or voicemail message, to be delivered prior to an event that reminds the sender to schedule a message.

Aspects of the present invention may be implemented by an apparatus and/or by a computer program stored on a computer readable medium. The computer readable medium may comprise a disk, a client device, a network device, and/or a propagated signal.

Other features and advantages will be apparent from the following description, including the drawings, and from the claims.

DETAILED DESCRIPTION

Figure 1:
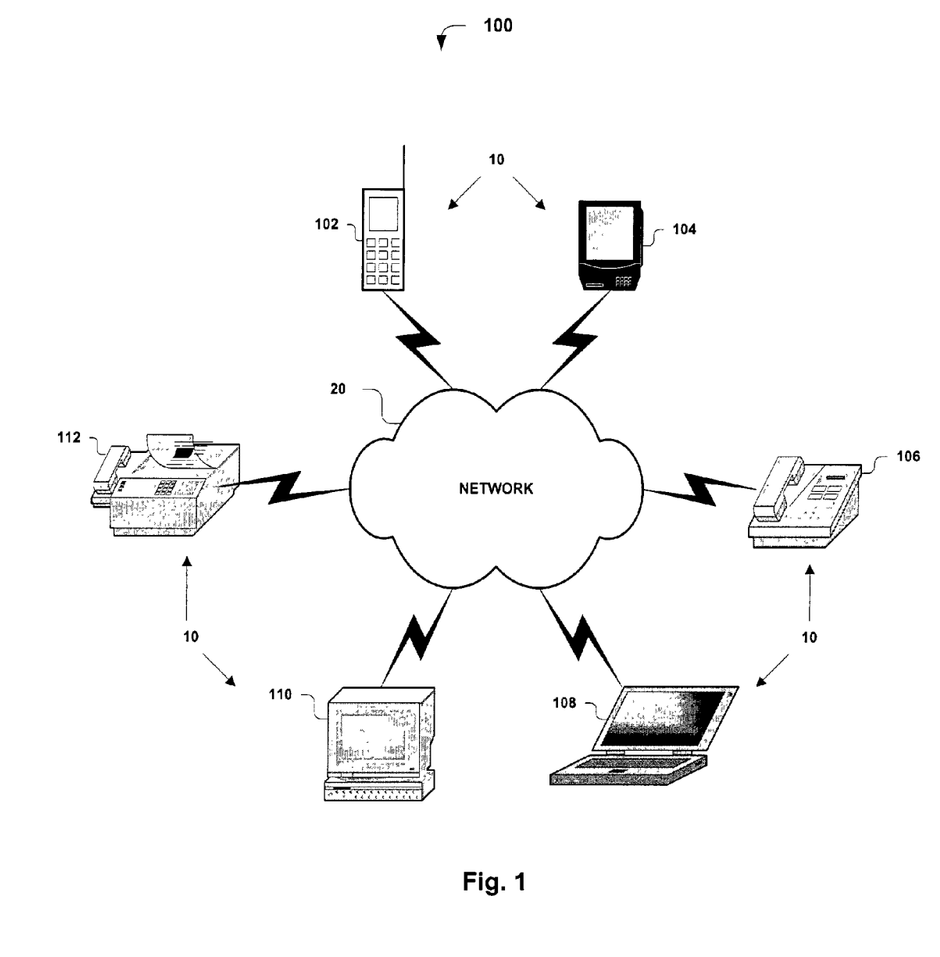
FIG. 1 is a block diagram illustrating aspects of a communications system.

FIG. 1 illustrates an exemplary communications system 100. For brevity, several elements in the figure are represented as monolithic entities. As shown, the communications system 100 includes several clients 10 interconnected through a network 20. In one implementation, the clients 10 include a first wireless device 102 and a second wireless device 104. Examples of wireless device include, but are not limited to, an Internet-enabled personal digital assistant (PDA), an Internet-enabled mobile telephone, an interactive pager such as one provided by Research in Motion (RIM) Inc., or any other type of device having a digital processor capable of accessing the network 20. In this implementation, the clients 10 also include a landline telephone 106, a personal computer (PC) 108, a workstation 110, and a facsimile (fax) machine 112.

In general, the clients 10 include hardware and/or software components for communicating with the network 20 through wired and/or wireless communication pathways. The clients 10 may be structured and arranged to communicate using various communication protocols (e.g., HTTP, WAP) and encapsulation protocols (e.g., UDP) to establish connections between network elements and/or to operate within or in concert with one or more other systems (e.g., the Internet and/or the World Wide Web).

The clients 10 may include one or more software applications and/or computer programs for commanding and directing communications. The software applications and/or computer programs may be embodied permanently or temporarily in any type of machine, component, physical or virtual equipment, storage medium, or propagated signal capable of providing instructions to the wireless device. In particular, the software applications and/or computer programs may be stored on a storage media or device (e.g., EEPROM, magnetic diskette, or propagated signal) readable by a computer system, such that if the storage media or device is read by the computer system, the functions described herein are performed.

The network 20 is configured to enable communication between and among the clients 10. For example, the network 20 may enable the first wireless device 102 to send and/or receive messages from the second wireless device 104, the telephone 106, and/or other any other client 10 irrespective of physical separation. The network 20 may directly or indirectly connect the clients 10 and may include and/or form part of an information delivery network such as, for example, an analog or digital wireless telecommunications network, the Internet, and/or the World Wide Web ("Web"). The information delivery network may include a local area network (LAN), a wide area network (WAN), a telephone network (e.g., analog, digital, wired, wireless, PSTN, ISDN, or xDSL), a radio network, a television network, a cable network, a satellite network, and/or any other communications network configured to carry data. Each network may include one or more elements such as, for example, intermediate nodes, proxy servers, routers, switches, adapters, and wired or wireless data pathways, configured to direct and/or deliver data.

In some implementations, the network 20 may include, for example, Mobitex® technology of the Cingular Interactive Intelligent Wireless Network service provided by Cingular Wireless. Aspects of the Mobitex® network may include a two-way wireless data service capable of connecting to other complimentary networks. A wireless data service such as the Mobitex® network includes a hierarchy of communications systems that can provide nationwide wireless service through a network of base stations and local switches under the control of higher order regional switches or exchanges.

In general, the network 20 may support a variety of telecommunications and/or data services including Internet and/or Web services and interactive messaging services. Providing Internet and/or Web services may involve enabling access by computer systems running client programs to electronic documents stored in computer systems running server programs. For example, information on the Web typically is provided by Web servers and is accessible by a client program such as a Web browser (e.g., Netscape's Navigator, Microsoft's Internet Explorer, Java's microbrowser). Web browsers and other client programs may use a communications protocol such as Hypertext Transfer Protocol ("HTTP") to request electronic documents from Web servers.

Information on the Internet and/or Web may be represented by specially formatted text files (e.g., Web pages) written in Hypertext Markup Language (HTML) or some other markup language, such as XML, HDML, and/or VRML. Each text file may be identified by a network address such as a Universal Resource Locator (URL). A typical Web page may include one or more hyperlinks referring to the network addresses of other Web pages. Hyperlinks may be displayed as underlined text or graphical images that when clicked, send a request for the associated page. For example, when a hyperlink in a home page is selected, a request is sent out by the client to the address specified in the hyperlink, and the associated Web page is downloaded and displayed, replacing the home page on the user's screen with the associated Web page.

Providing interactive messaging services may include, for example, enabling users to send, receive, and forward text messages, voice messages, e-mail messages, and/or facsimile messages. In particular, mobile-to-mobile text messaging allows a sender to create and transmit text messages using the mobile number of a recipient. E-mail messaging allows a sender to address e-mail messages using the mobile number of a recipient. Web messaging allows users to send personalized text messages from a public Web site. Users may subscribe to information services and receive alerts concerning news, stock quotes, sports scores, entertainment, or other information displayed on a digital mobile phone. Users may send and receive numeric and/or alphanumeric pages; send and retrieve voicemail messages; and send, receive, forward, and/or print out faxes using a digital phone and a fax machine. Interactive voice response (IVR) services process remote touch-tone entries from users to query a database and obtain computerized voice responses. Text-to-speech services allow users having only telephone access to convert text messages into audio format.

In one implementation, the network 20 supports a telecommunications service that provides users with enhanced scheduled messaging services. In particular, the network 20 supports a telecommunications service that enables users to create and schedule a message for delivery at one or more specified times.

Figure 2:
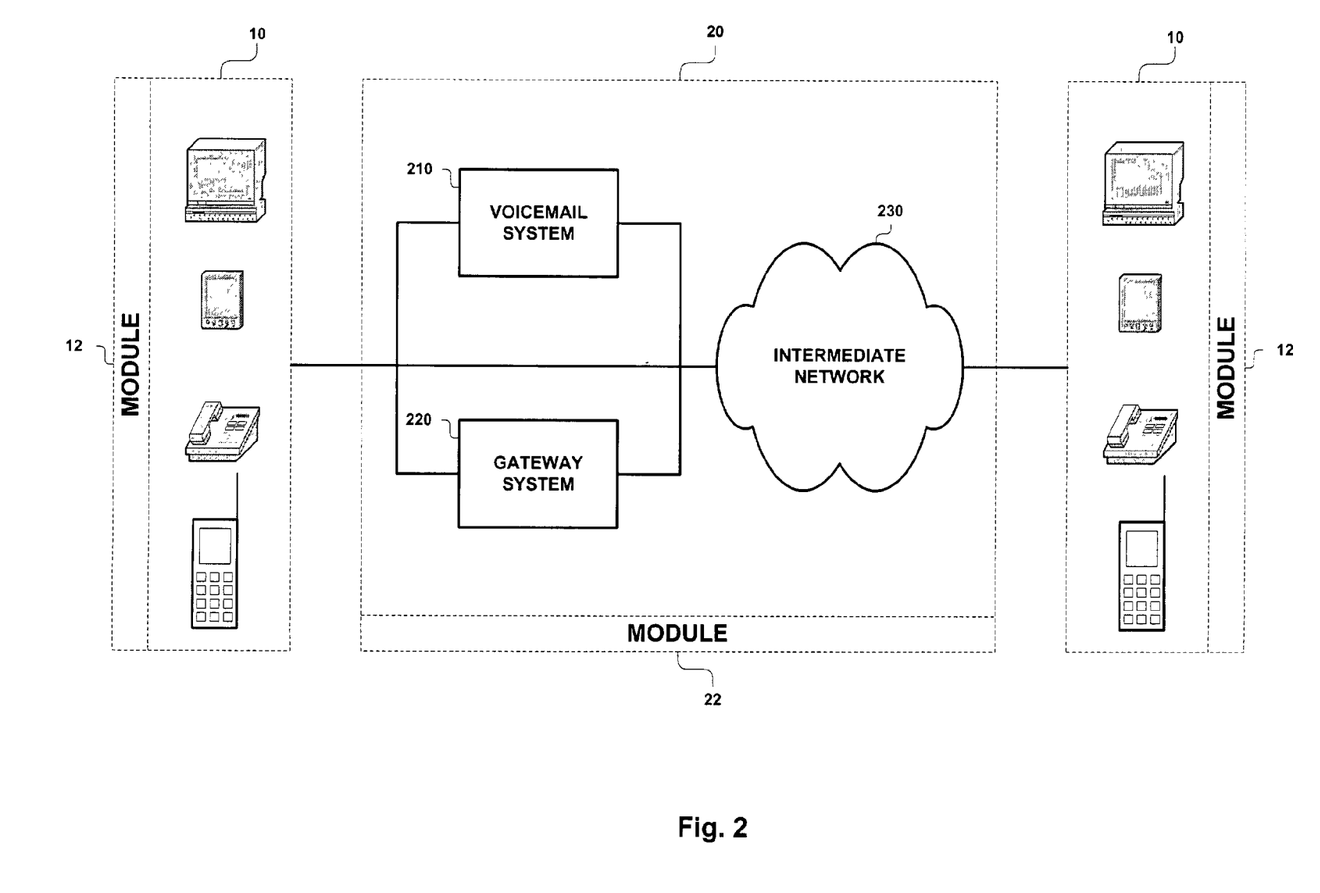
FIGS. 2–4 are block diagram expansions of aspects of FIG. 1.

FIG. 2 illustrates one implementation of the communications system 100 of FIG. 1. In this implementation, the communications system 100 includes clients 10 connected through a network 20. In this implementation, the clients 10 and the network 20 each include one or more devices operating under the direction of an associated control module, i.e., a client control module 12 and a network control module 22. The broken lines are intended to indicate that in some cases, the control module (e.g., client control module 12 and/or network control module 22), or portions thereof considered collectively, may instruct one or more elements of the associated systems (e.g., client 10 and/or network 20) to operate as described.

One example of a device is a general-purpose computer capable of responding to and executing instructions. Other examples include a special-purpose computer, a PC, a workstation, a server, a laptop, or any other component, machine, tool, equipment, or some combination thereof capable of responding to and executing instructions.

One example of a control module is a software application (e.g., operating system, browser application, micro-browser application, server application, proxy application, gateway application, tunneling application, ISP application, and/or other communication application) loaded on one or more devices that commands and directs the communications enabled by the device. Other examples include a computer program, a piece of code, an instruction, another device, or some combination thereof. The control module may be implemented as software code utilizing any suitable computer language (e.g., Java, Perl, C or C++) using object-oriented techniques, for example. The control module also may be a computer, such as a workstation or PC, a microprocessor, a network server, a Java virtual machine, or an application specific integrated circuit, using any suitable type of computer instructions.

A control module (e.g., client control module 12 and/or network control module 22) may be embodied permanently or temporarily in any type of machine, component, physical or virtual equipment, storage medium, or propagated signal capable of providing instructions to a device. In particular, the control module (e.g., software application, computer program) may be stored on a storage media or device (e.g., ROM, magnetic diskette, or propagated signal) readable by a general or special purpose computer system, such that if the storage media or device is read by the computer system, the functions described herein are performed.

As shown, the network 20 includes a voicemail system 210 and a gateway system 220 that are in communication with each other and an intermediate network 230. In general, the voicemail system 210 may be configured to generate, store, process, retrieve, and/or deliver scheduled voicemail messages. For example, the voicemail system 210 may generate a scheduled voicemail message in response to data (e.g., voice data, audio data) and instructions (e.g., specified message content, recipient name/number, delivery date/time) from a client 10, the gateway system 220, and/or the intermediate network 230.

The voicemail system 210 may maintain scheduled voicemail messages within various storage locations (e.g., database locations) within the voicemail system 210. For example, a scheduled message may be stored within a designated scheduled message area of the sender's voice mailbox until a specified delivery time.

The voicemail system 210 also may be configured to determine and store attributes of a scheduled voicemail message, such as a name and/or a number associated with the sender and/or recipient(s) of the voicemail message, the scheduled delivery time of the voicemail message, the duration (e.g., in minutes) of the scheduled voicemail message, and one or more message identifiers associated with the data and/or specified content of each scheduled voicemail message. The message identifiers may include, for example, one or more pointers indicating various storage locations of the data (e.g., voice data and/or audio data) and/or the specified content associated with each scheduled voicemail message.

The voicemail system 210 may be configured to process the scheduled voicemail messages and/or attributes of the scheduled voicemail message in response to the data and instructions received from a client system 10, the gateway system 220, and/or the intermediate network 230. In some cases, the voicemail system 210 may process the scheduled voicemail messages and/or attributes of the scheduled voicemail messages automatically according to the delivery time specified by the sender. For example, at a time specified by the sender, the voicemail system 210 may automatically move or copy a scheduled voicemail message (and/or attributes of scheduled voicemail messages) stored in a designated scheduled message area of the sender's voice mailbox to an area of the recipient's voice mailbox designated for receiving voicemail messages.

The voicemail system 210 may be configured to allow the sender to review, edit, update, and/or delete scheduled messages. In some implementations, the voicemail system 210 also may generate reminders for the sender prior to the scheduled delivery time (e.g., one week, one day) and perform processing upon receiving instructions from the sender. For example, the voicemail system 210 may insert a reminder message in the sender's voice mailbox that informs the sender that a scheduled voicemail message is about to be delivered and/or requests confirmation that delivery is to proceed.

In general, the gateway system 220 may be configured to detect content (e.g., voicemail messages and/or attributes of voicemail messages) in the various storage locations within the voicemail system 210 and to transmit notifications indicating the presence of such content. For example, the gateway system 220 may detect a scheduled voicemail message in a recipient's voice mailbox and send a notification to a client 10 associated with the recipient. The notification may contain attributes of the scheduled voicemail message such as the time of receipt, sender attributes (e.g., name, number), the duration of the voicemail message, and/or message identifiers that may be used to a scheduled voicemail message.

After delivering the notification, the gateway system 220 may receive an instruction from a client 10 (e.g., first wireless device 102) to play the scheduled voicemail message. Upon receiving the instruction, the gateway system 220 may retrieve the scheduled voicemail message (i.e., voice data, audio data, and/or specified content) from the voicemail system 210 for rendering by the client 10.

The voicemail system 210 may be configured to retrieve a particular scheduled voicemail message associated with a notification. In one implementation, the voicemail system 210 receives a notification from the gateway system 220 and/or from a client 10. Upon receiving the notification, the voicemail system 210 may extract message identifiers from the notification and use the message identifiers to locate a particular scheduled voicemail message. As described above, the message identifiers may include pointers to the exact storage locations containing the data and content of the scheduled voicemail message.

After retrieving the scheduled voicemail message, the voicemail system 210 may deliver the voicemail message to a client 10 of the recipient. Alternatively, the voicemail system 210 may deliver the retrieved scheduled voicemail to the gateway system 220 for subsequent delivery to a client 10 of the recipient.

Once a scheduled voicemail message has been delivered to a recipient, the voicemail system 210 may replicate and/or move the scheduled voicemail messages (and/or attributes of scheduled voicemail messages) to an area the sender's voice mailbox designated for confirmation of delivered scheduled voicemail messages. In some implementations, the gateway system 220 may send a notification to the sender confirming the delivery of the scheduled voicemail message, and the sender may use the notification to access and review the delivered scheduled message. The voicemail system 210 also may provide the sender with the ability to update and reschedule (e.g., same date/time next year) the delivered scheduled voicemail message. The voicemail system 210 also may allow the sender to schedule the voicemail message for delivery to one or more other recipients.

As shown in FIG. 2, the voicemail system 210 and the gateway system 220 also communicate with an intermediate network 230. In general, the intermediate network 230 functions as a delivery system for carrying and routing messages among clients 10 and/or elements of the network 20. For example, the intermediate network 230 may include an analog or digital wireless telecommunications network (e.g., PSTN) for carrying messages to one or more clients 10 from the gateway 220 and/or for carrying messages from one or more clients 10 to the voicemail system 210. The intermediate network 230 also may include one or more LANs and/or WANs for interconnecting the voicemail system 210 and the gateway system 220. Additionally, the intermediate network 230 may include or make up part of the Internet and/or the Web.

Figure 3:
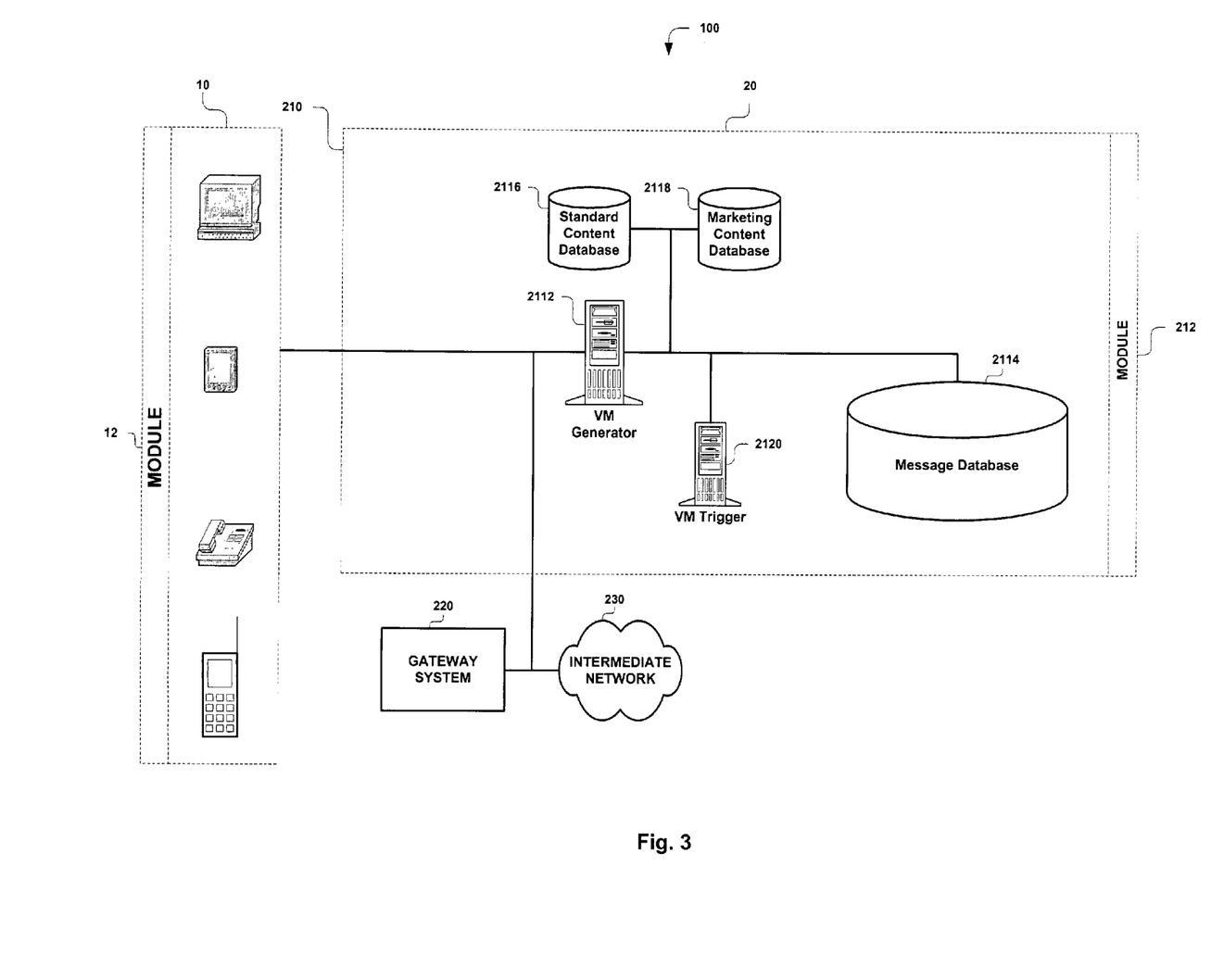

Referring to FIG. 3, a block diagram expansion of FIGS. 1 and 2 focuses primarily on one implementation of the network 20 and, in particular, on aspects of the voicemail system 210. It is to be understood that while the following description of FIG. 3 uses the voicemail system 210 to illustrate certain aspects of the present invention, the description may be applicable as well to other elements of the communications system 100 (e.g., gateway system 220 and/or the intermediate network 230).

In this implementation, the communications system 100 includes a network 20 having a voicemail system 210. The voicemail system 210 may operate under the direction of a gateway system control module 212 (e.g., software code) installed on one or more devices of the voicemail system 210. As shown in FIG. 3, the network 20 includes a voicemail system 210 in communication with a gateway system 220 and an intermediate network 230.

In one embodiment, the voicemail system 210 includes a voicemail ("VM") generator 2110, a VM server 2112, a standard content database 2114, a marketing content database 2116, a VM message database 2118, and a VM processor 2120.

The VM generator 2110 generally may be configured to compile scheduled voicemail messages in response to data and instructions from the sender. In one implementation, the sender may use a client 10 (e.g., a mobile telephone) to transmit data and instructions to the VM generator 2110. The client 10 may access the VM generator 2110 directly, through the gateway system 220, and/or through the intermediate network 230.

In some cases, the VM generator 2110 may allow the sender to select one or more menu options for scheduling a voicemail message. The menu options may be selected through IVR or key entry, for example, and enable the sender to generate data and specify instructions for delivery. For example, the sender may record a spoken message, i.e. voice data for delivery to one or more recipients. The sender may specify instructions identifying the one or more recipients and indicating the scheduled delivery time. The sender also may specify instructions for delivering standard content and/or marketing content, described in more detail below.

In some implementations, the sender may use a Web-enabled client (e.g., PC, Web-enabled mobile telephone, Web-enabled handheld device) to transmit data and instructions to the VM server 2112 (e.g. Web server). For example, the client 10 may be provided with a microphone, a memory, and communications capability enabling the sender to record a spoken message, generate audio data (e.g., .wav file, .vox file), and transmit the audio data to the VM server 2112. The client 10 may access the VM server 2112 directly, through the gateway system 220, and/or through the intermediate network 230.

In some cases, the VM server 2112 may present the sender with a graphical user interface (e.g., Web page) that allows the sender to specify instructions identifying one or more recipients and indicating the scheduled delivery time. The sender also may use the graphical user interface to specify instructions for delivering standard content and/or marketing content, described in more detail below.

Standard content and marketing content may be stored in the standard content database 2114 and the marketing content database 2116, respectively. While the standard content database 2114 and the marketing database 2116 are shown in FIG. 3 as individual and separate databases, in other implementations, the standard content database 2114 and the marketing database 2116 may include multiple databases or be combined in a single database.

The standard content and the marketing content generally may include various types of predefined audio data available for delivery to one or more recipients. For example, the standard content may include a greeting corresponding to a particular occasion (e.g., holiday, birthday, graduation, etc.). The greeting may include a prerecorded voice message and/or sounds specified by the sender. In some implementations, a voice message specified by the sender may include the voice of one or more celebrities (e.g., actors, famous personalities, performance artists, etc.) and/or characters (e.g., cartoon characters and/or fictional characters such as Santa Claus). The sounds specified by the sender may include, for example, music, songs, and/or special effects (e.g., applause, laughter, etc.).

The marketing content may include a message associated with services available from one or more service providers (e.g., telecommunications service provides) and/or merchandisers (e.g., retailers, manufacturers). In some implementations, the message may notify the recipient of a certain gift (e.g., good and/or service) purchased by the sender for the recipient. The gift message may include a gift certificate or gift check to be claimed by the recipient and paid for by the sender. For example, the sender may purchase a gift such as a certain amount of prepaid long distance credit that is to be delivered to the recipient with a scheduled voicemail message. Thus, after the recipient plays the scheduled voicemail message, the recipient may use the long distance credit to reply to the voicemail message and/or place a call to the sender.

In other implementations, the message may advertise a certain good and/or service to the recipient. For example, an advertising message may be included automatically with every scheduled message as a method of generating revenue and/or covering the cost of providing the scheduled messaging service. The advertising message may extend an offer for a good/and or service and also provide the recipient with the ability to accept the offer for the good and/or service.

As described above, the VM generator 2110 may be configured to compile scheduled voicemail messages in responses to data and instructions received from the sender. The data may include voice data and/or audio data to be delivered to a recipient as a scheduled voicemail message. The instructions may include the scheduled delivery time and identify any standard and/or marketing content to be included with the scheduled voicemail message.

In one embodiment, the VM generator 2110 may compile a scheduled voicemail messages by retrieving specified standard content and/or specified marketing content and then combining the retrieved standard and/or marketing content with the data (e.g., voice data, audio data) from the sender. The VM generator 2110 then may store the compiled schedule voicemail messages (i.e., the data, the standard content, and/or the marketing content) in the VM message database 2118.

In another embodiment, rather than retrieving the actual standard content and/or the marketing content, the VM generator 2110 may associate a standard content identifier indicating the storage location within the standard content database 2114 of specified standard content and/or a marketing content identifier indicating the storage location within the marketing content database 2116 of specified marketing content with the data (e.g., voice data, audio data) from the sender. The VM generator 2110 then may store the compiled schedule voicemail messages (i.e., the data, the standard content identifier, and/or the marketing content identifier) in the VM message database 2118.

In yet another embodiment, the VM generator 2110 may store the data from the sender in a designated area of the VM message database 2118 and obtain a message identifier indicating the storage location of the data. The VM generator 2110 the may compile a scheduled voicemail message including the message identifier, the standard and/or marketing content, and/or the standard and/or marketing content identifiers. The VM generator 2110 may store the compiled scheduled voicemail messages in another area of the VM message database.

The VM generator 2110 also may be configured to determine attributes of the compiled scheduled voicemail messages. The attributes may include, for example, a name and/or a number associated with the sender, the duration (e.g., in minutes) of the voicemail message, and/or identifiers of stored data, standard content and/or marketing content. The attributes may be used to notify a recipient of a scheduled voicemail message as well as to retrieve elements of the scheduled voicemail message from various storage locations (e.g., the standard content database 2114, the marketing content database 2116, and/or the VM database 2118).

The VM message database 2118 may include a system of folders corresponding to subscribers of the voicemail system 210. In general, the folders may contain compiled scheduled voicemail messages and/or attributes (e.g., identifiers) of scheduled voicemail messages. For example, a sender's folder may include data, content, and/or identifiers associated with a compiled scheduled voicemail message. At the scheduled delivery time, the data, content, and/or identifiers in the sender's folder may be copied and stored in the recipient's folder.

The VM processor 2120 may be configured to process the scheduled voicemail messages and/or attributes of the scheduled voicemail message in response to the data and instructions received from the sender. In general, at the scheduled delivery time specified by the sender, the VM processor 2120 may automatically move or copy a scheduled voicemail message (and/or attributes of scheduled voicemail messages) stored in a designated scheduled message area of the sender's voice mailbox to an area of the recipient's voice mailbox designated for receiving voicemail messages.

In one embodiment, the VM processor 2120 may extract or receive information from the VM generator 2110 and maintain a log of voicemail messages to be delivered. As the scheduled delivery time for a particular scheduled voicemail message approaches, the VM processor 2120 may send a reminder to the sender and allow the sender to review, edit, update, and/or delete a scheduled voicemail message. Upon receiving instructions to proceed with the scheduled delivery, the VM processor 2120 may deliver the scheduled voicemail message to a recipient. After delivering the scheduled message, the VM processor 2120 may send a notification to the sender and allow the sender to review, edit, update and rescheduled the voicemail message and/or create a new scheduled voicemail message.

Figure 4:
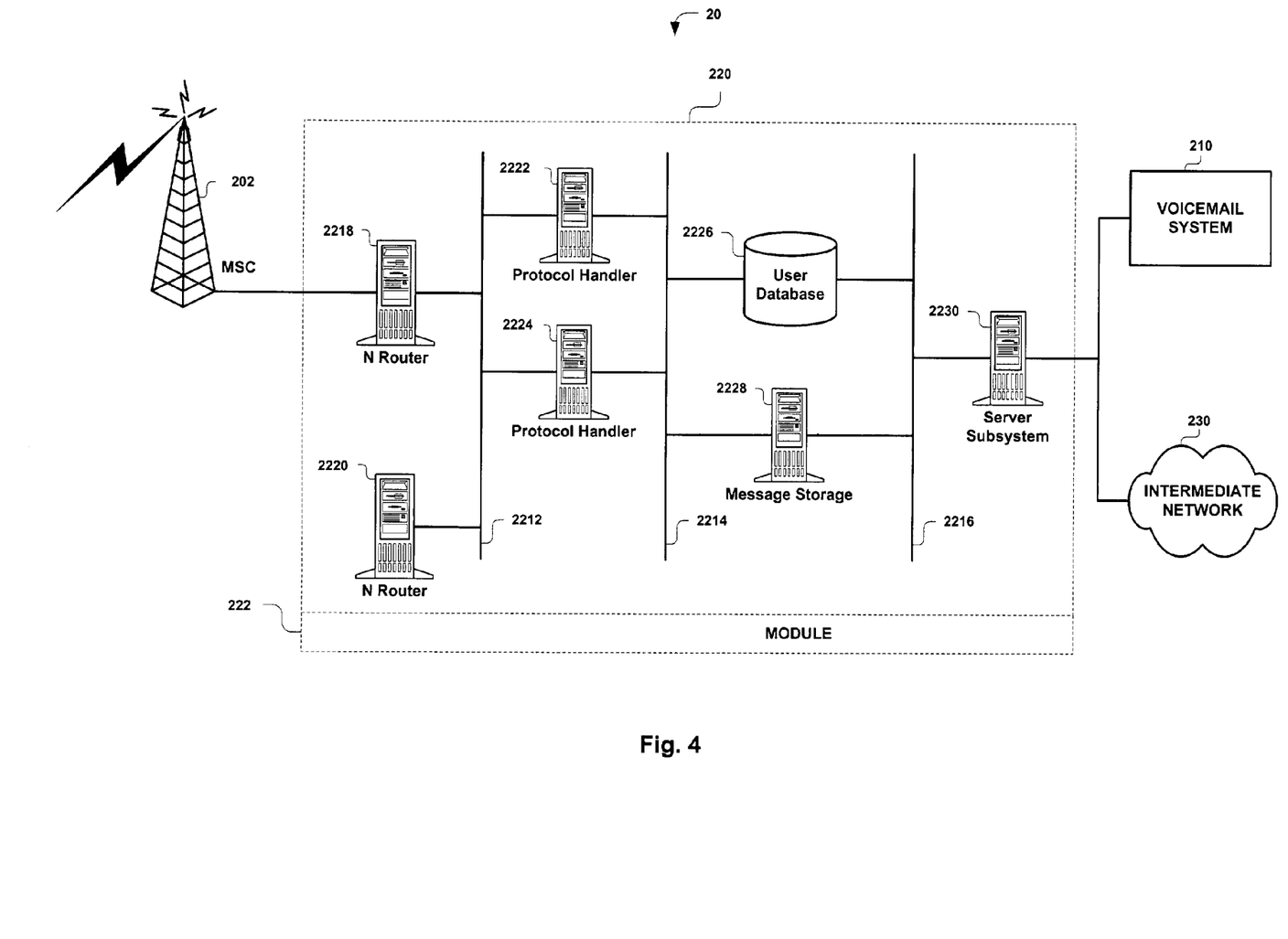

Referring to FIG. 4, a block diagram expansion of FIGS. 1 and 2 focuses primarily on one implementation of the network 20 and, in particular, on aspects of the gateway 220. It is to be understood that while the following description of FIG. 4 uses the gateway 220 to illustrate certain aspects of the present invention, the description may be applicable as well to other elements of the communications system 100 (e.g., voicemail system 210 and/or the intermediate network 230).

In this implementation, the communications system 100 includes a network 20 having a gateway system 220. The gateway system 220 may operate under the direction of a gateway system control module 222 (e.g., software code) installed on one or more devices of the gateway system 220. As shown in FIG. 4, the network 20 includes a gateway system 220 in communication with a MSC 202, a voicemail system 210, and an intermediate network 230.

The gateway system 220 may be configured from a standard Santa Cruz Operation (SCO) UNIX system running an Internet-accessible operating system such as Windows NT by Microsoft. The system may use TCP/IP and UDP for communications and hypertext markup language (HTML) to support Internet web browsers, including those provided by Netscape and Microsoft. The computer language used by the gateway system 220 may be, for example, in the C programming language, Java or HTML.

In general, the gateway system 220 may be configured to transfer message within the network 20 and among interconnected networks (e.g., intermediate network 230). In some implementations, the gateway system 220 may perform protocol conversions that are necessary to enable communications through the intermediate network 230. For example, the gateway system 220 may carry out protocol conversion between a mobile communications protocol (e.g., WAP) employed by a wireless device and an Internet communication protocol (e.g., HTTP, TCP/IP) employed by the intermediate network 230. Such protocol conversion may involve routing messages through a network gateway processor that transforms messages from a foreign protocol to a native protocol.

The gateway system 220 also may perform content encoding, such as the encoding of wireless markup language (WML) into binary format, and compilation of WML-Scripts. Additionally, the gateway system 220 may manage the flow of data and the volume of communications traffic over the network 20, by limiting the bandwidth size of data packets, for example, in order to preserve the integrity of the network 20.

The network 20 includes a mobile switching center (MSC) 202 for connecting to one or more wireless devices (e.g., first wireless device 102, second wireless device 104). Although only one MSC is illustrated in FIG. 3, it is to be understood that the network 20 may include a larger number of MSCs. In general, the MSC 202 functions as an interface between wireless devices and the network 20. The MSC 202 may include transmitters, receivers, and switching devices for providing either digital or analog cellular telephone service and for performing switching functions to permit communication between wireless devices. The MSC 202 also may perform various communications functions such as user identification, subscription verification, location detection, mobile tracking, call processing, call routing, and/or other signaling functions necessary to control calls to and from other telecommunications and data systems.

The gateway system 220 operates under the direction of a control module 222. The broken lines are intended to indicate that in some implementations, the control module 222, or portions thereof considered collectively, may instruct one or more elements of the gateway system 220 to operate as described.

In one implementation, the gateway system 220 includes one or more internal networks 2212, 2214, and 2216, such as local area networks (LANs), configured to interconnect various elements of the gateway system 220. For example, the internal networks 2212, 2214, and 2216 may interconnect components including Nrouters 2218 and 2220, protocol handlers 2222 and 2224, a user database 2226, a message storage server 2228, and a server subsystem 2230.

At the gateway system 220, the Nrouters 2218 and 2220 communicate with one or more MSCs 202 including regional switches residing at remote locations. The communication between the regional MSC 202 and the Nrouters 2218, 2220 may use, for example, an X.25 protocol. Generally, the Nrouters 2218 and 2220 are configured to route and deliver messages received at the MSC 202 to various elements within the network 20. Each of the Nrouters 2218 and 2220 may include one or more dual-ported connectivity cards, for example, those provided by Eicon Networks, so that each Nrouter may support multiple Fast-Sequenced Transport (FST) connections. In one implementation, the gateway system 220 can handle up to 255 Nrouters.

The Nrouters 2218 and 2220 may communicate with protocol handlers 2222, 2224 over an internal network 2212 using, for example, X-sockets. In general, the protocol handlers 2222 and 2224 are configured to provide support for any customized protocols (e.g., application-specific protocols) necessary to access customized objects. For example, if a particular object is supported by a protocol other than a standard communication protocol (e.g., HTTP, TCP/IP), the protocol handlers 2222 and 2224 may use a specified application protocol to retrieve and access the particular object. In one implementation, the protocols handled by protocol handlers 2222, 2224 may specify that message storage and internal e-mail access may be handled by the UNIX standard Network File System (NFS) distributed file system from SUNSOFT, which allows data to be shared across the network regardless of the protocol. Each protocol handler 2222 and 2224 also may maintain a database cache (not shown) configured to maintain recently accessed data in order to increase the speed of internal network communications and to limit database access requests over the internal networks 2212, 2214 and 2216.

Additionally, the protocol handlers 2222, 2224 may process information contained in user database machines, such as user database 2226. The protocol handlers 2222, 2224 may use data from the user database 2226 to communicate with other systems or networks external to the gateway system 220. Generally, the user database 2226 contains an interface to content addressable memory (CAM) (not shown) for updating information, e.g., user account information and status. Each user associated with the wireless communications system 100 may have an account maintained in the user database 2226 including a unique identifier, such as a MOBITEX® access number, for example. Information maintained in the user database 2226 may be used to validate users, monitor usage, and maintain billing information.

The gateway system 220 also may include a message storage server 2228 configured to store and forward messages (e.g., e-mail, voicemail, fax, data) intended for one or more recipients. The intended recipient may be a user of the network 20 that has subscribed to receive one or more interactive messaging features. The message storage server 2228 may include a system of folders configured to store interactive messaging content associated with subscribers. Interactive messaging provides, for example, a way of communicating with the ability of sending, receiving, and forwarding text messages, voice message, e-mail messages, and/or facsimile messages. The message storage server 2228 may store various content associated with interactive messaging and allow users to retrieve and manage such content.

The message storage server 2228 also may contain various routing and delivery program modules configured to deliver messages to a recipient or to an intermediate component for subsequent delivery to a recipient. One or more backup databases or servers may be used in the gateway system 220, each backup database being synched automatically by sockets communications.

As shown in FIG. 4, the network 20 and, in particular, the gateway system 220 includes a server subsystem 2230. Generally, the server subsystem 2230 is configured to provide interactive communications services such as, for example, messaging services, information services, paging services, voicemail services, facsimile services, interactive voice response (IVR) services, and text-to-speech services. In one implementation the server subsystem 2230 may be configured to detect a received message (e.g., voicemail message) and send a notification to a wireless device associated with the recipient of the received message. The server subsystem 2230 also may be configured to receive instructions and/or a notification and route the instructions and/or notification to the voicemail system 210.

In some implementations, the functions described above with respect to the voicemail system 210 may be performed by the gateway system 220 and, in particular, the server subsystem 2230. For example, in some implementations, the voicemail system 210 may be included within and/or form part of the server subsystem 2230.

Figure 5:
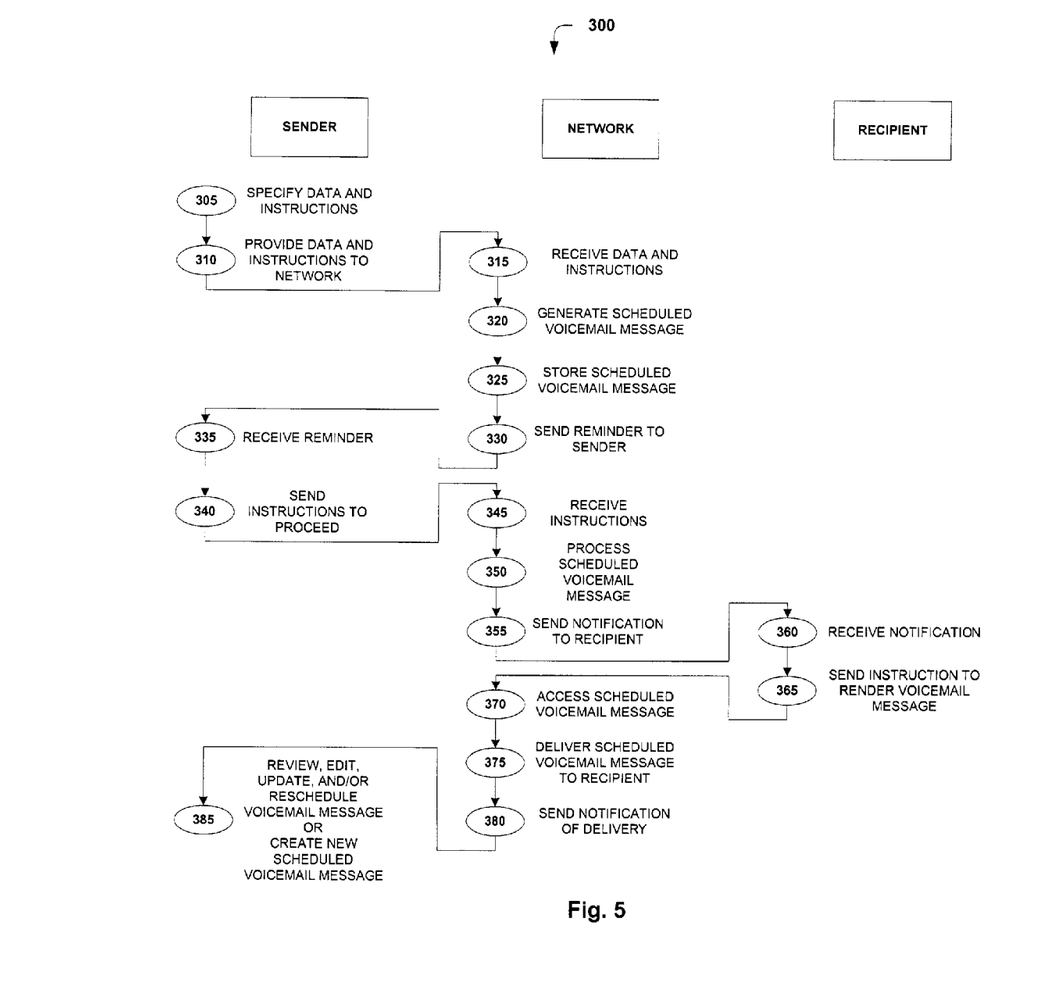
FIG. 5 is a flow chart of a communications method that may be implemented by the communications system illustrated in FIGS. 1–4.

Referring to FIG. 5, a sender, a recipient, and a network interact according to one possible procedure 300 for providing enhanced scheduled messaging services. In general, the sender and/or the recipient may have attributes comparable to aspects of a client 10 and the network may have attributes comparable to aspects of a network 20, described above.

The procedure 300 begins when the sender specifies data and instructions for a scheduled voicemail message (step 305) and provides the data and instructions to the network (step 310). The data may include voice data and/or audio data to be delivered to a recipient as a scheduled voicemail message. The instructions may include the scheduled delivery time and identify any standard and/or marketing content to be included with the scheduled voicemail message. The sender may specify the data and instructions using any type of client such as a mobile phone, landline telephone, and/or computer system.

The network receives the data and instructions from the sender (step 315) and, in response, generates a scheduled voicemail message (step 320). The scheduled voicemail message may include a compilation of data, content (e.g., standard content, marketing content), and/or identifiers (e.g., message identifiers, standard content identifiers, marketing content identifiers). The network then stores the scheduled voicemail message until the scheduled delivery time (step 325). The network may store a scheduled voicemail message in a designated area of the sender's voice mailbox.

As the scheduled delivery time for a particular scheduled voicemail message approaches, the network sends a reminder to the sender (step 330). The reminder may enable the sender to review, edit, update, and/or delete a scheduled voicemail message.

The sender receives the reminder (step 335) and, if appropriate, sends instructions to the network to proceed (step 340). Upon receiving the instructions to proceed with the scheduled delivery (step 345), the network processes the schedule voicemail message according to the data and instructions from the sender at the scheduled delivery time (step 350). The network may process the scheduled voicemail message by storing the scheduled voicemail message and/or attributes of the scheduled voicemail message in a designated area of a recipient's voice mailbox.

The network then sends a notification of the scheduled voicemail message to the recipient (step 355). In general, the notification indicates that the recipient has a new voicemail message. That is, the notification does not identify the voicemail message as being scheduled. The notification may include certain information about the voice message such as, for example, the time of receipt, sender attributes, the size (e.g., duration) of the message, and a message identifier.

Upon receiving the notification (step 360), the recipient instructs the network to render the scheduled voicemail message (step 365). The notification may be displayed as a graphical user interface capable of conveying information and soliciting user input. The instruction from the recipient may identify a particular device to which the voicemail message is to be delivered. In response to the instruction from the recipient, the network accesses the scheduled voicemail message (step 370) and delivers the scheduled voicemail message to the recipient (375).

After delivering the scheduled message to the recipient (step 375), the network sends a notification to the sender that the scheduled voicemail message was delivered successfully (step 380). The sender may then review, edit, update and rescheduled the voicemail message and/or create a new scheduled voicemail message (385), at which point, the process 300 repeats.

Referring to FIGS. 6A–6F, one possible embodiment of a set of user interfaces (UIs) 400A–400F may be used to specify data and instructions. In one implementation, a network may present the UIs 400A–400F as Web pages to a sender using a Web-enabled device. As shown, the UIs 400A–400F enable the sender to specify data and instructions for delivering a scheduled voicemail message in accordance with aspects of the present invention.

Figure 6A:
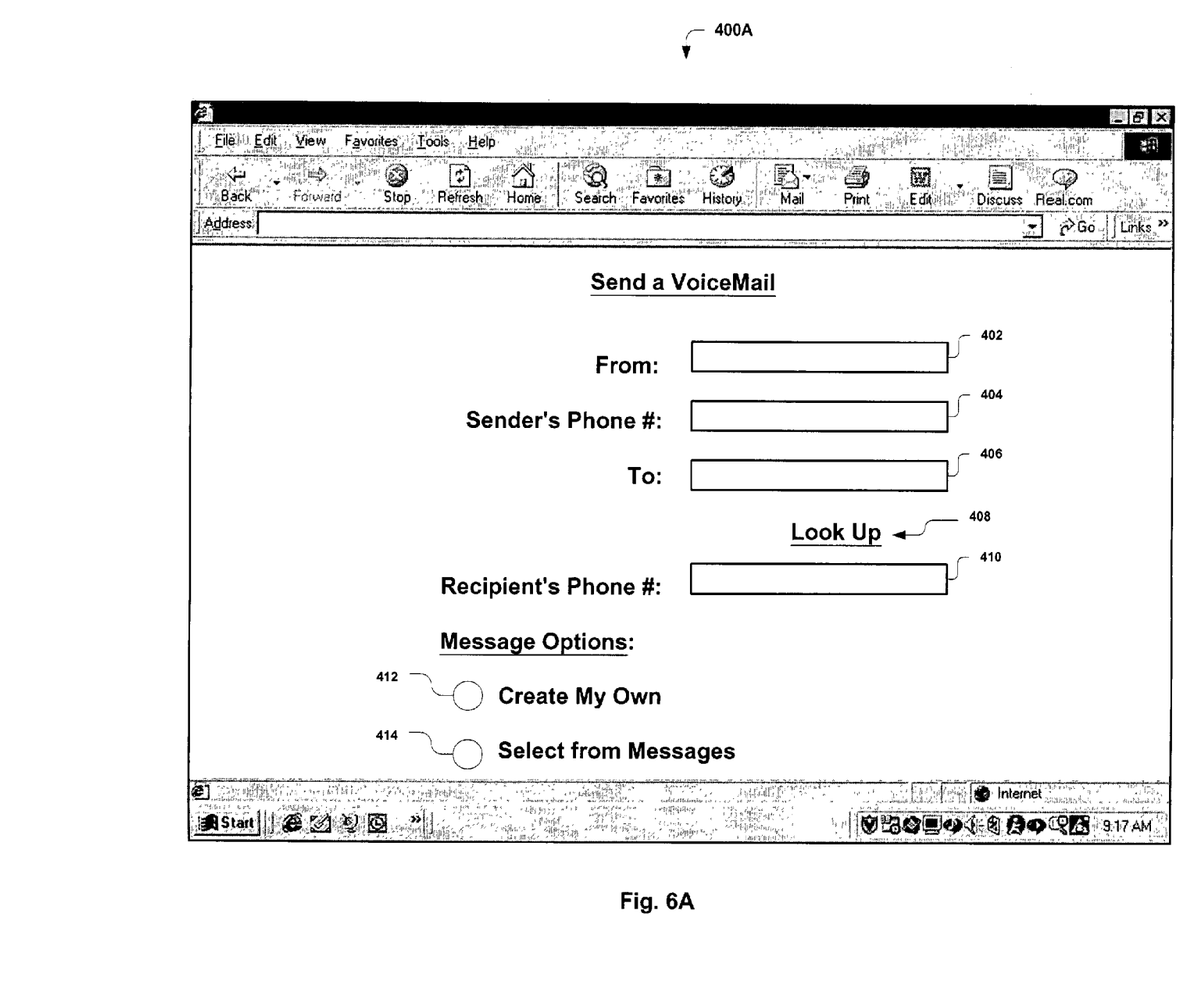
FIGS. 6A–6F illustrate graphical user interfaces that may be implemented by the communications system illustrated in FIGS. 1–4.

FIG. 6A illustrates one embodiment of a UI 400A that may be presented to a sender. As shown, the UI 400A may include a first text entry box 402 for inputting the name of the sender. The UI 400A also may include a second text entry box 404 for inputting a phone number associated with the sender, and a third text entry box 406 for inputting the name of the recipient. The UI 400A may include a look up link 408 for displaying a pop-up screen directory assistance screen. In one implementation, a directory assistance database may be referenced in order to determine whether the recipient can receive a voicemail message. For example, the database may contain a listing of subscribers associated with a particular telecommunications provider.

The UI 400A further may include a fourth text entry box 410 for inputting a telephone number associated with the recipient. In addition, the UI 400A may include a first button 412 for selection the option of creating a voicemail message and a second button 414 for selecting the option of choosing a prerecorded voicemail message.

Figure 6B:
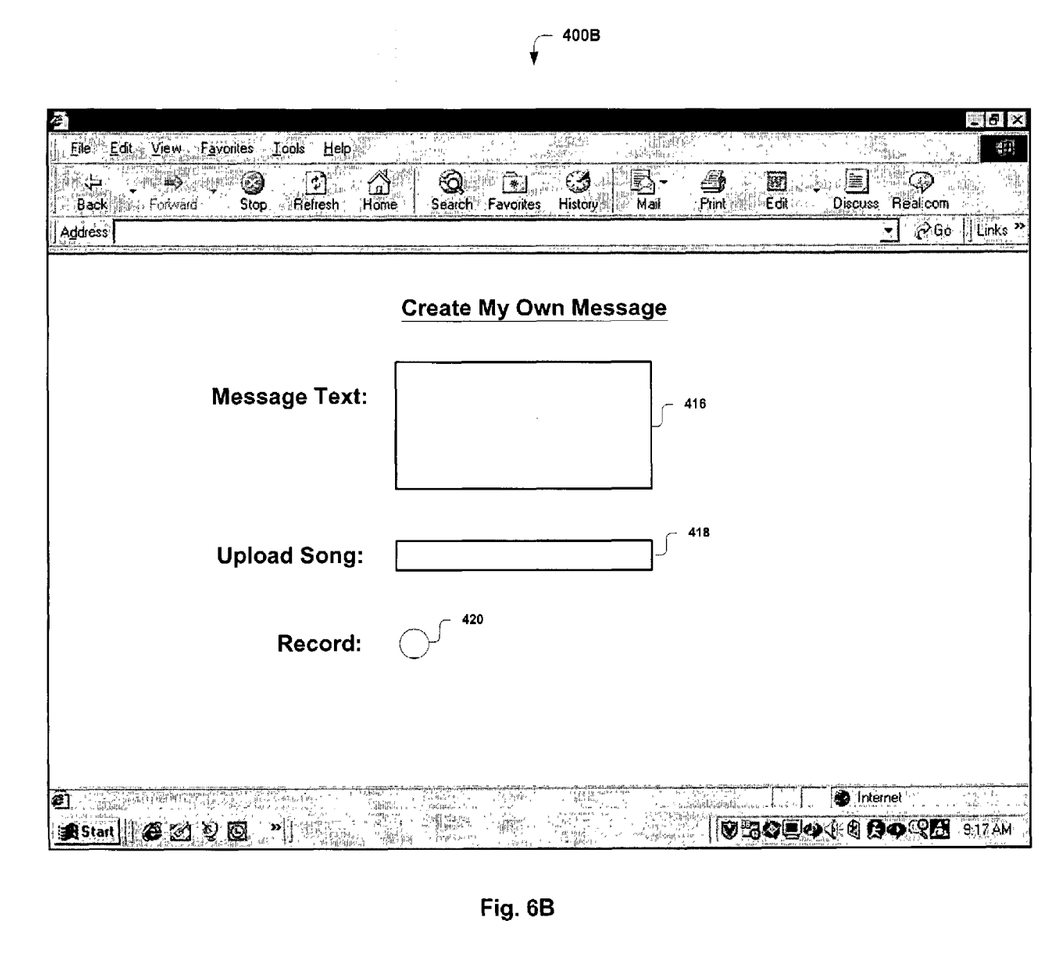

FIG. 6B illustrates one embodiment of a UI 400B that may be presented to a sender. In one implementation, the UI 400B may be presented when the first button 412 is selected indicating the option of creating a voicemail message. As shown, the UI 400B may include a first text entry box 416 for inputting the text of a voicemail message. In some cases, the first text entry box 416 may be configured to filter undesirable and/or objectionable words. The UI 400B also may include a search box 418 for locating a file, for instance, a music file, located on the hard drive of a computer and/or network server. The UI 400B further may include a button 420 for enabling the sender to record (i.e., dictate) a voicemail message.

Figure 6C:
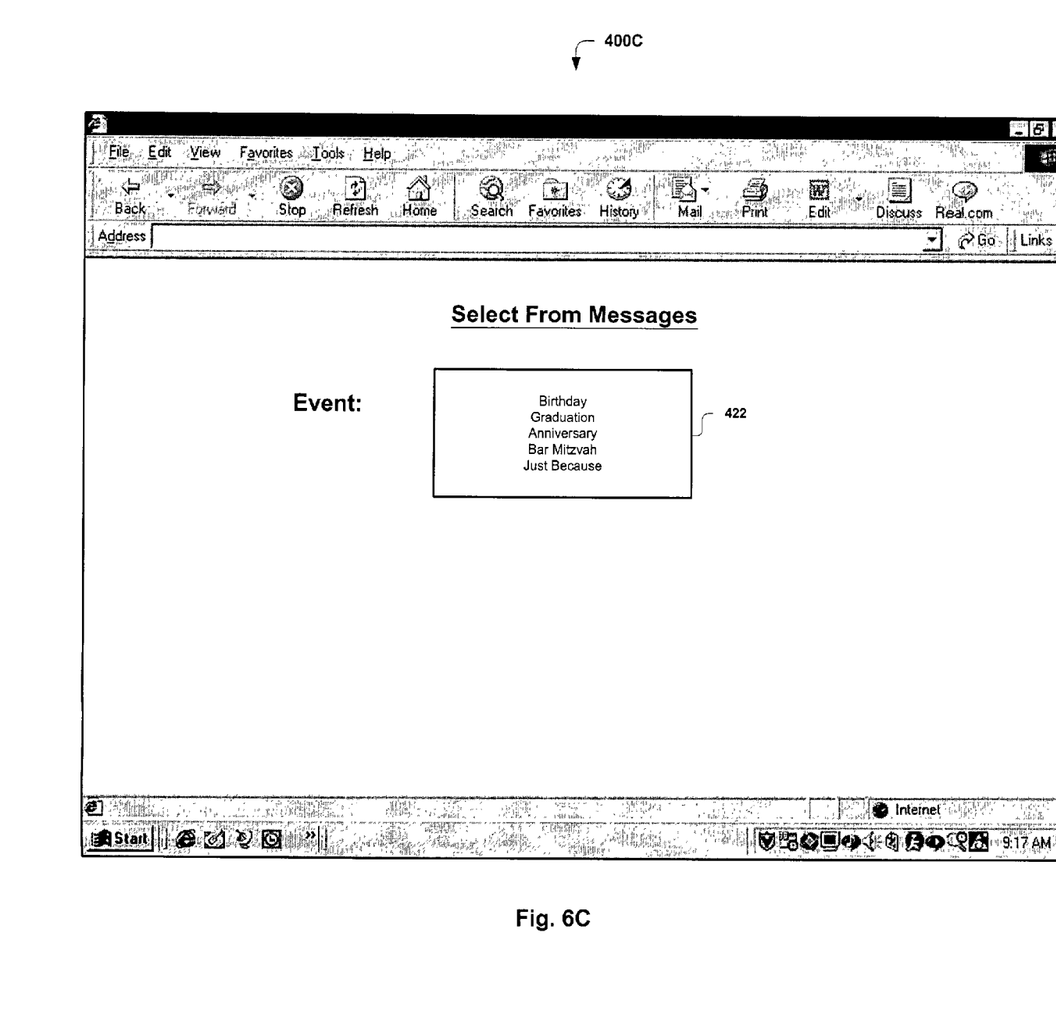

FIG. 6C illustrates one embodiment of a UI 400C that may be presented to a sender. In one implementation, the UI 400C may be presented when the second button 414 is selected indicating the option of choosing a prerecorded voicemail message. As shown, the UI 400C may include a menu 422 for selecting the type of event associated with the voicemail message. Upon selecting an event, the sender may be presented with music and voice talents corresponding to the event. For example, the sender may choose to have a character such as Santa Clause give a Christmas wish or a famous celebrity wish a happy graduation.

Figure 6D:
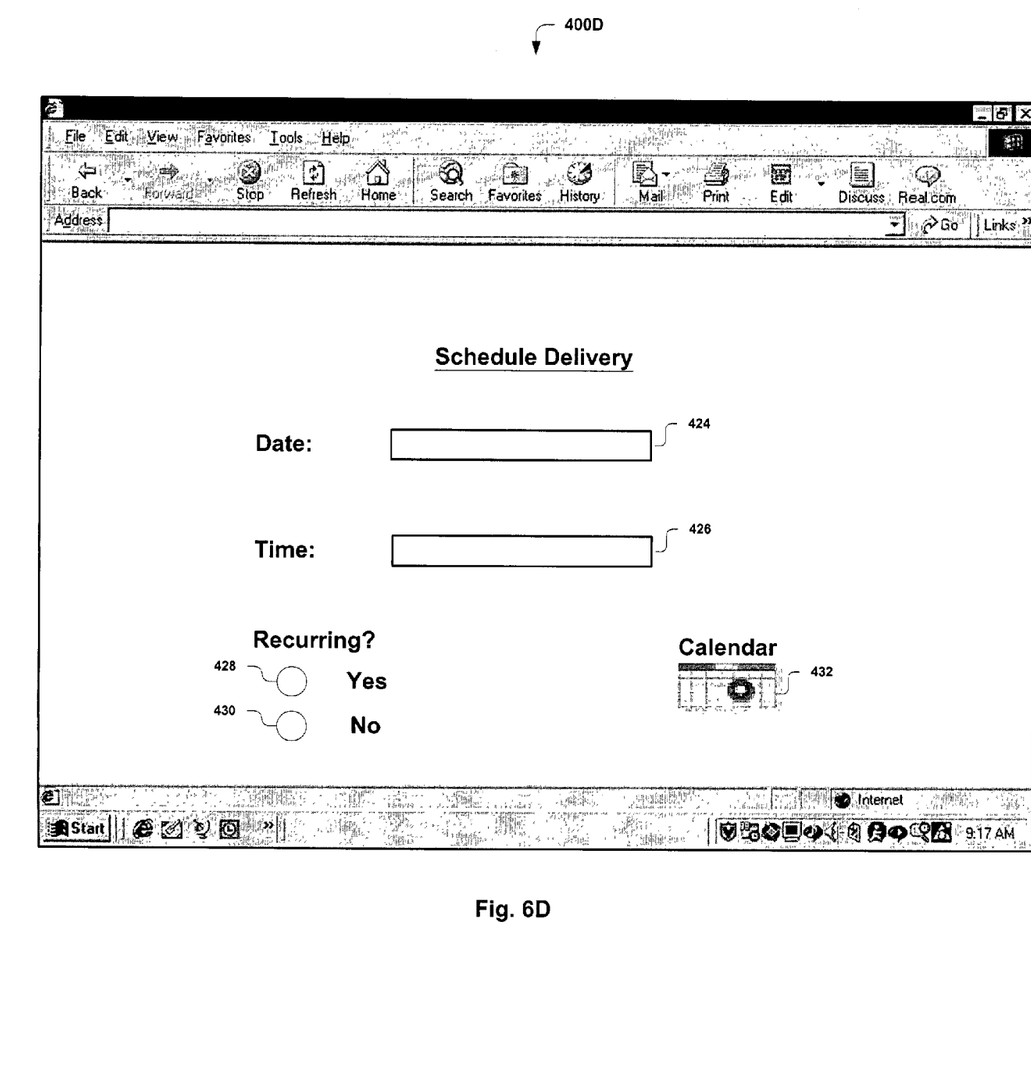

FIG. 6D illustrates one embodiment of a UI 400D that may be presented to a sender. In one implementation, the UI 400D may be presented after the content of the message has been determined. As shown, the UI 400D may include a first text entry box 424 for inputting the date of delivery and a second text entry box 426 for inputting the time of delivery. The UI 400D also may include a YES button 428 and a NO button 430 for indicating whether the message is to be delivered on a recurring basis. For example, selecting the YES button 428 may allow the sender to indicate that a birthday wish is to be delivered at the same date/time every year. The UI 400D further may include a calendar icon 432 that when selected allows the sender to review a list of scheduled messages.

Figure 6E:
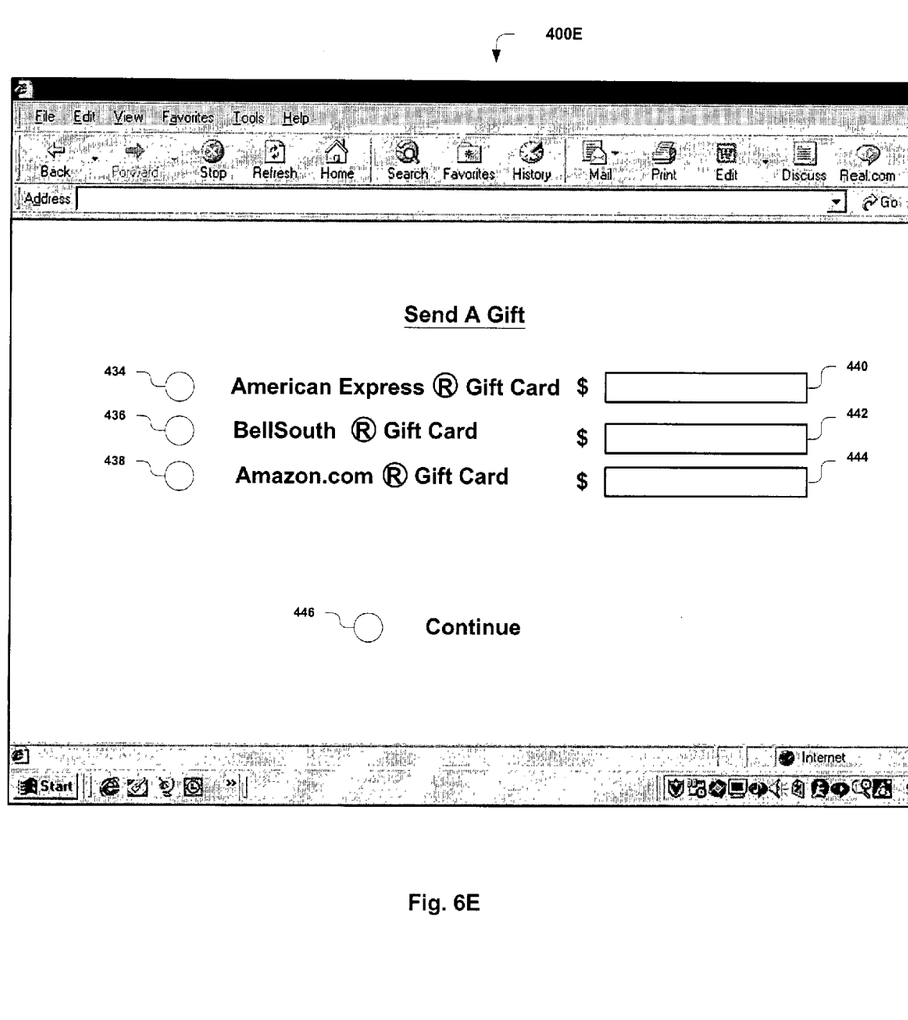

FIG. 6E illustrates one embodiment of a UI 400E that may be presented to a sender. In one implementation, the UI 400E may be presented after the message has been scheduled. As shown, the UI 400E may include a first button 434 for purchasing an American Express® gift card, a second button 436 for purchasing a BellSouth® gift card, a third button 438 for purchasing an Amazon.com® gift card. The UI 400E also may include a first text entry box 440 for specifying a dollar value of the American Express® gift card, a second text entry box 442 for specifying a dollar value of the BellSouth® gift card, and a third text entry box 444 for specifying a dollar value of the Amazon.com® gift card. It is to be understood that these types of gifts are only examples and that other types of goods and services may be made available. The UI 400E further may include a continue button 446 for bypassing this option and/or continuing after a particular gift card and amount have been selected.

Figure 6F:
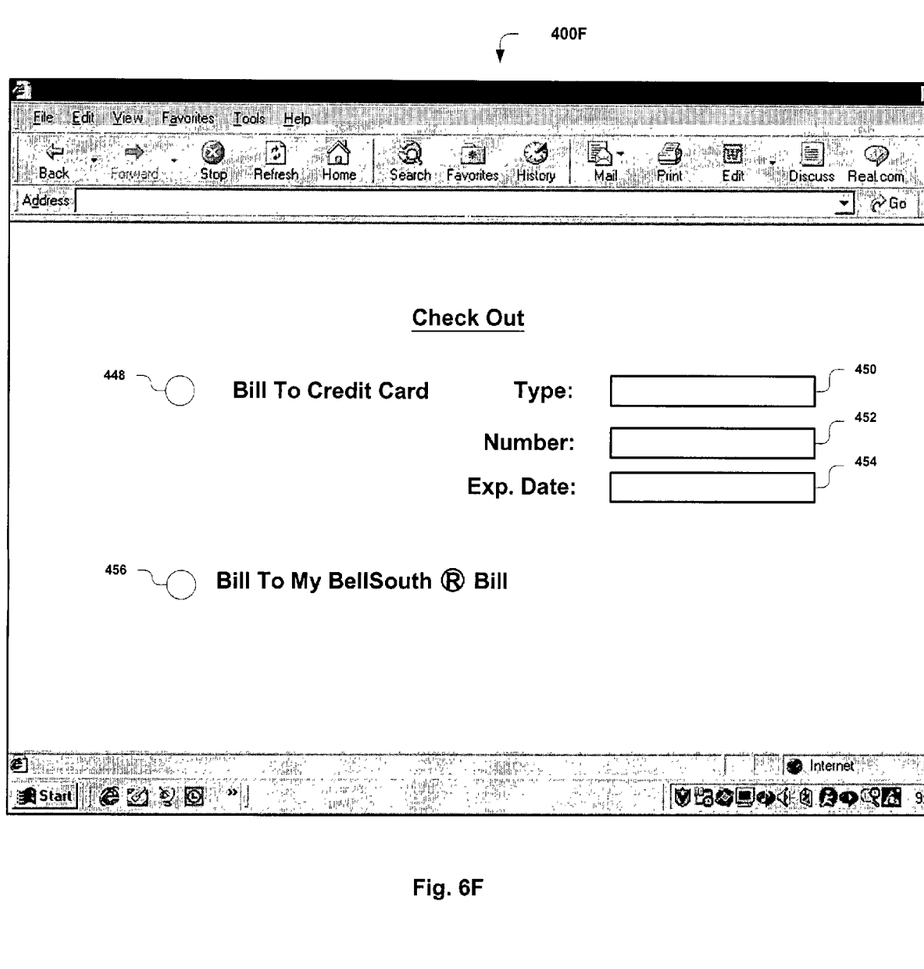

FIG. 6F illustrates one embodiment of a UI 400F that may be presented to a sender. In one implementation, the UI 400F may be presented after the message has been scheduled and/or a gift has been purchased. As shown, the UI 400F may include a first button 448 for selecting to bill the cost of the scheduled message and/or gift to a credit card. The UI 400F also may include a first text entry box 450 for inputting the type of credit card, a second text entry box 452 for inputting the credit card number, and a third text entry box 454 for inputting the expiration date of the credit card. Once this information is entered, credit card authorization and processing may be performed. The UI 400F further may include a second button 456 for selecting to bill the cost of the scheduled message and/or gift to an account (e.g., telephone account). If this option is selected the charge for the scheduled message and/or gift may show up on the sender's next telephone bill.

A number of implementations have been described. Nevertheless, it will be understood that various modifications may be made and that other implementations are within the scope of the following claims.

What is claimed is:

1. A communications method, comprising:
    receiving data and instructions from a sender, the instructions including at least a delivery time of a scheduled voicemail message intended for a recipient and contact information associated with the recipient;
    generating a scheduled voicemail message according to the data and instructions received from the sender;
    storing the scheduled voicemail message;
    processing the scheduled voicemail message according to the data and instructions received from the sender; and
    sending a reminder to the sender as the scheduled delivery time for a particular scheduled voicemail message approaches.

2. The communications method of claim 1, wherein the data comprises at least one of voice data and audio data.

3. The communications method of claim 1, wherein instructions indicate at least one of standard content and marketing content to be included with the scheduled voicemail message.

4. The communications method of claim 3, wherein the standard content comprises a greeting.

5. The communications method of claim 4, wherein the greeting comprises one or more of a prerecorded voice message and sounds specified by the sender.

6. The communications method of claim 5, wherein the prerecorded voice message comprises a voice of a celebrity.

7. The communications method of claim 5, wherein the prerecorded voice message comprises a voice of a character.

8. The communications method of claim 5, wherein the sounds comprise one or more of music, songs, and sound effects.

9. The communications method of claim 3, wherein the marketing content comprises a message associated with at least one of a service provider and a merchandiser.

10. The communications method of claim 3, wherein the marketing content comprises a gift message.

11. The communications method of claim 3, wherein the marketing content comprises an advertising message.

12. The communications method of claim 1, wherein the data and instructions are received from at least one of a mobile phone, a landline telephone, and a Web-enabled device.

13. The communications method of claim 1, wherein the generated scheduled voicemail message comprises one or more of data, content, and identifiers.

14. The communications method of claim 13, wherein the content comprises one or more of standard content and marketing content.

15. The communications method of claim 13, wherein the identifiers comprise one or more of a message identifier a standard content identifier, and a marketing content identifier.

16. The communications method of claim 1, wherein the scheduled voicemail message is stored until the scheduled delivery time.

17. The communications method of claim 1, wherein the scheduled voicemail message is stored in a designated area of a sender's voice mailbox.

18. The communications method of claim 1, wherein the scheduled voicemail message is stored in a designated area of a recipient's voice mailbox.

19. The communications method of claim 1, wherein processing the scheduled voicemail message comprises storing one or more of the scheduled voicemail message and attributes of the scheduled voicemail message in a designated area of a recipient's voice mailbox.

20. The communications method of claim 1, wherein the reminder enables the sender to perform one or more of reviewing, editing, updating, and deleting a scheduled voicemail message.

21. The communications method of claim 1, further comprising sending a notification of the scheduled voicemail message to the recipient.

22. The communications method of claim 21, wherein the notification does not identify the voicemail message as being scheduled.

23. The communications method of claim 1, further comprising delivering the scheduled voicemail message to the recipient.

24. The communications method of claim 1, further comprising sending a notification to the sender that the scheduled voicemail message was delivered.

25. The communications method of claim 24, wherein the notification enables the sender to perform one or more of reviewing, editing, updating and rescheduling the voicemail message.

26. The communications method of claim 24, wherein the notification enables the sender to create a new scheduled voicemail message.

27. A communications system, comprising a network apparatus configured to:
    receive data and instructions from a sender, the instructions including at least a delivery time of a scheduled voicemail message intended fur a recipient and contact information associated with the recipient;
    generate a scheduled voicemail message according to the data and instructions received from the sender;
    store the scheduled voicemail message;
    process the scheduled voicemail message according to the data and instructions received from the sender to store the voicemail message in an area of the voice mailbox of the recipient that is designated for scheduled voicemail messages and to provide a notification to the recipient at the time the voicemail message is scheduled for delivery;
    receive a request from the recipient to render the voicemail in response to the recipient receiving the notification; and
    deliver the voicemail message from the designated area of the voice mailbox of the recipient to the recipient upon receiving the request from the recipient.

* * * * *